United States Patent [19]

Seidler

[11] 3,914,007

[45] Oct. 21, 1975

[54] TEST CLIP

[75] Inventor: Jack Seidler, New Rochelle, N.Y.

[73] Assignee: Continental Specialties Corporation, New Haven, Conn.

[22] Filed: June 24, 1974

[21] Appl. No.: 482,157

[52] U.S. Cl. ............ 339/255 P; 24/67.9; 24/137 R; 24/255; 339/261

[51] Int. Cl.² .......................................... H01R 11/22

[58] Field of Search.. 339/17 C, 17 CF, 75, 108 TP, 339/255 P, 260, 261; 24/67.9, 137 R, 138, 255; 128/303.13, 303.14, 303.17, 303.18, 404, 416, 418, DIG. 4; 324/72.5, 149

[56] References Cited

UNITED STATES PATENTS

| | | | |
|---|---|---|---|
| 67,100 | 7/1867 | Brinkerhoff | 24/255 A |
| 2,885,758 | 5/1959 | Russo et al | 24/138 R |
| 3,130,463 | 4/1964 | Posey | 24/137 R |
| 3,169,816 | 2/1965 | Hammond et al. | 324/72.5 |
| 3,506,949 | 4/1970 | Venaleck et al. | 339/255 P |
| 3,624,590 | 11/1971 | Bolduc | 339/255 P |

*Primary Examiner*—Joseph H. McGlynn
*Attorney, Agent, or Firm*—DeLio and Montgomery

[57] ABSTRACT

A clip for connecting an electrical component to testing equipment, comprising a plurality of conductive elements mounted in a holder in positions to engage the respective leads of a multi-lead electrical package and to connect said leads to components of the testing equipment, the conductive element holder comprising flat plates joined by a deformable web to constitute an integral core unit, the upper and lower surfaces of said unit being normally non-parallel and the conductive elements being fixed on said surfaces by upper and lower covers, the conductive elements projecting beyond the rear edges of the covers and terminating within the covers at the front end.

9 Claims, 12 Drawing Figures

TEST CLIP

This invention relates to clips for connecting the leads of an electrical component, such as a multi-lead electrical or electronic package, to testing equipment. The leads (e.g., input/output) of such a package are conventionally disposed, in single or double array, adjacent one edge of the package and uniformly spaced at positions about 2.5 mm., center to center. In the present clip a plurality of conductive elements are mounted in a holder in positions such that their forward ends can engage the leads of an electrical or electronic package (disposed as just described), the conductive element holder comprising flat plates joined by a deformable web to constitute an integral core unit, the upper and lower surfaces of said unit being non-parallel (or movable out of parallelism) and the conductive elements being fixed on said surfaces by upper and lower covers. The conductive elements project beyond the rear edges of the covers for convenient attachment to testing equipment.

It is known, broadly, to provide connecting clips with single or plural contacts and hinged, spring or cam actuated supports in various combinations. When a plurality of contacts are provided the device tends to require great precision in manufacture and rigidity of assembly, hence increased expense.

It is an object of the invention to provide a test clip having a core unit which may be molded, economically, of a suitable plastic material as an integral piece, on which other elements may be mounted.

It is another object of the invention to provide a core unit comprising upper and lower flat plates joined by an integral deformable web, to permit relative rocking movement of the plates.

It is a further object to provide upper and lower covers which serve to fix the several conductive elements precisely in their proper positions on the upper and lower surfaces of the core unit.

It is another object to provide a core unit having front ends which guard and support the conductive elements almost to their points of contact with the leads of an electrical or electronic package.

It is a still further object to provide certain improvements in the form, construction, arrangement and materials of the several parts whereby the above-named and other objects may effectively be attained.

The invention accordingly comprises a clip possessing the features, properties and the relation of elements which are exemplified in the device hereinafter described.

A practical embodiment of the invention is shown in the accompanying drawing, wherein.

Figures 1, 2, 3, 4, 5, 6, 7, 8, 9, 10, 11, 12:
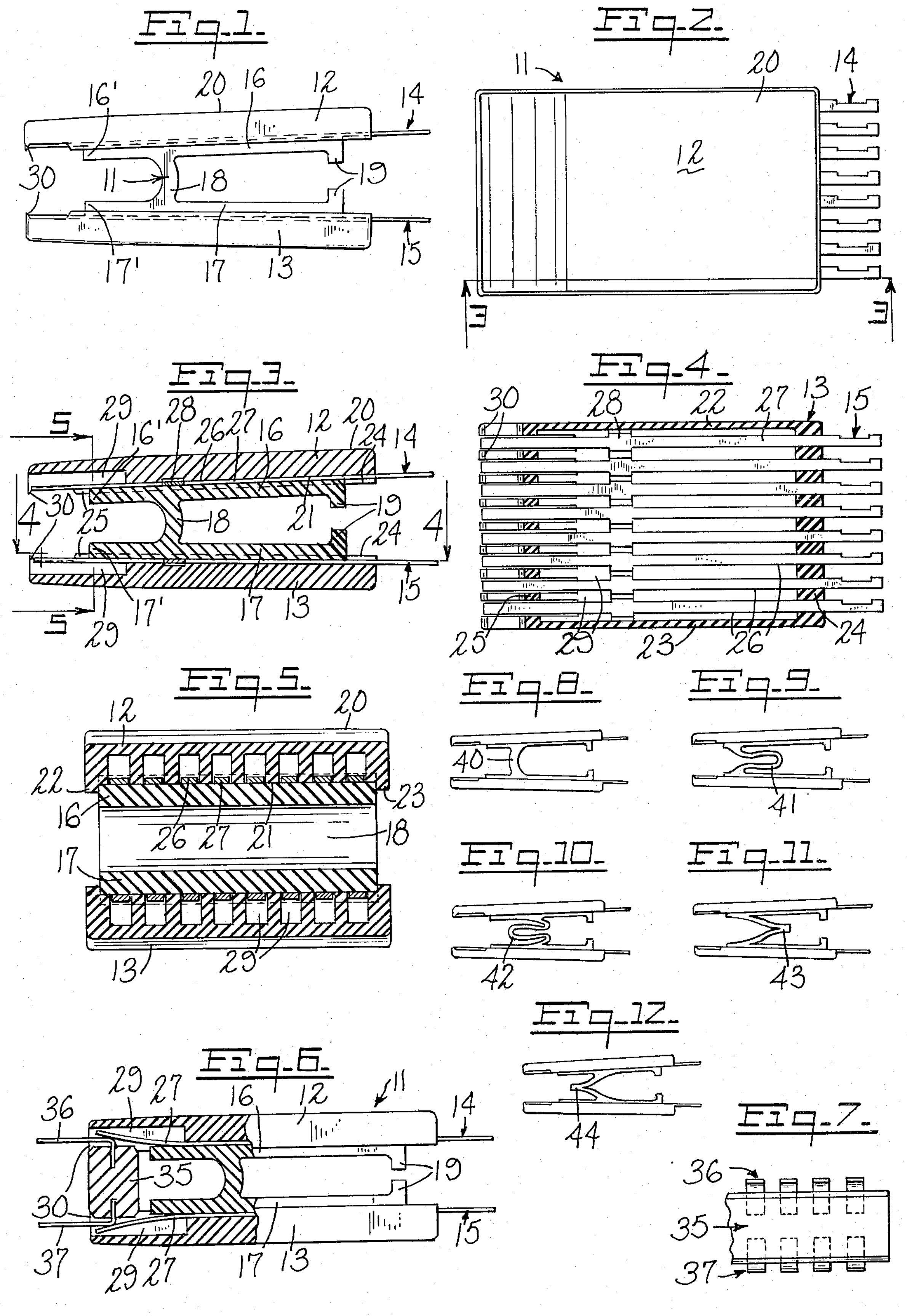
FIG. 1 represents a side elevation of the clip.
FIG. 2 represents a top plan view of the clip.
FIG. 3 represents a vertical longitudinal section on the line 3—3 of FIG. 2.
FIG. 4 represents a horizontal section on the line 4—4 of FIG. 3.
FIG. 5 represents a vertical transverse section on the line 5—5 of FIG. 3.
FIG. 6 represents a side elevation, partly in section, showing the clip connected to an electrical package.
FIG. 7 represents a side elevation, partly broken away, of the package itself.

FIGS. 8 to 12 represent side elevations, like FIG. 1, showing alternative forms of deformable webs in the core unit of the clip. Referring to the drawings, the clip comprises a core unit 11, upper and lower covers 12, 13, and upper and lower sets of conductive elements or bars 14, 15. The core unit is constituted by upper and lower plates 16, 17 connected by a deformable web 18 at a point spaced from the forward ends 16′, 17′ of the plates. Stops 19 extend downward and upward from the plates, adjacent their rear ends, and the whole unit is of such a shape that it can readily be molded as one piece in a single operation. In the unstressed position of the core unit the plates 16, 17 may lie somewhat closer together at their front ends than at the rear (FIGS. 1 and 3).

The covers 12, 13 are identical so that only one need be described in detail. The outer surface 20 of the cover is generally flat; the inner surface 21 is flat throughout an area corresponding to the area of a plate 16 or 17 and is provided with lateral flanges 22, 23, a rear flange 24 and a front flange 25, which aid in fixing the position of the cover on its respective plate. The surface 21 has a series of longitudinal grooves 26 throughout about two-thirds of its length, the grooves being profiled to receive snugly the conductive bars 27 (eight being shown), which may suitably be rectangular in cross-section and formed with cross-sectional disconformities in the form of short widened key portions 28, engaging in matching recesses in the walls of the grooves, to prevent longitudinal movement of the bars. At the front end of the cover each groove is enlarged to constitute a channel 29 into which the front end of the respective bar projects, part of the projection being supported by the adjacent forward end 16 ′ or 17 ′ of the core plate. At the front end of each groove the adjacent dividing walls between grooves may be formed with inwardly projecting teeth 30, to aid in holding a package to be tested. The rear ends of the conductive bars 14, 15 project beyond the rear ends of the covers, as shown in FIGS. 1, 3, 4 and 6, in positions to be connected to the leads of testing equipment, as may be required.

The parts of the clip can be assembled easily and reliably by placing the conductive bars in their respective grooves 26 (the longitudinal positions being fixed by the keys 28) and cementing or otherwise affixing the core plate surfaces to the adjacent cover surfaces, including flanges 22, 23, 24 and 25. Grooves corresponding or complementary to the grooves 26 could, if desired, be formed in the upper and lower core plate surfaces.

The electrical or electronic package with which the test clip is designed to be used is of the standard form shown at 35 in FIGS. 6 and 7, its pertinent elements being the arrays of input/output leads 36, 37. In use, the rear ends of the clip are pinched toward each other (their motion being limited by stops 19) and a package 35 is inserted between the front ends with its leads in register with the front ends of the conductive bars 14, 15. The latter, being in the form of flat springs, establish good contacts with the leads and have no tendency to slip laterally out of alignment, each bar end and its respective lead being laterally confined by the walls of the channels 29.

The deformable web 18 of the core unit may be of various cross-sectional forms, depending on the amount of flexibility desired, convenience in molding and other factors. Some alternative forms are shown in FIGS. 8 to 12, where FIG. 8 shows a web 40 of a straight-C shape, like web 18 but reversed; FIG. 9 shows a web 41 of elongated C shape (which could be reversed); FIG. 10 shows a triple-folded web 42 (which could also be reversed), and FIGS. 11 and 12 show flat-V webs 43, 44, pointing rearward (FIG. 11) or forward (FIG. 12). Core units of the character disclosed may have utility independently as clips for holding or manipulating various materials, and may be made in various dimensions for such purposes.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What I claim is:

1. A clip for connecting the leads of an electrical component to testing equipment comprising, a core unit constituted by upper and lower flat plates joined intermediate their ends by a deformable web, a plurality of elongated conductive elements extending across a surface of at least one plate and projecting beyond both ends of said plate, and at least one cover member fixed to said surface in a position to hold said conductive elements in place and to cover the projecting ends thereof at one end of the plate while leaving exposed the projecting ends at the other end of the plate.

2. A clip according to claim 1 which includes sets of conductive elements extending across the upper surface of the upper plate and the lower surface of the lower plate and upper and lower cover members fixed to each said surface.

3. A clip according to claim 1 wherein the web has a generally C-shaped cross-sectional form.

4. A clip according to claim 1 wherein the web has a triple-folded cross-sectional form.

5. A clip according to claim 1 wherein the web has a flat-V shaped cross-sectional form.

6. A clip according to claim 1 wherein the plates are generally rectangular in plan and wherein the deformable web biases the plates toward a position of rest wherein the plates lie closer together at one end than at the other end.

7. A clip according to claim 1 wherein each conductive element is in the form of a flat strip, the cover member being longitudinally grooved to form, with the adjacent plate surface, enclosed elongated channels, and said channels being proportioned to receive and hold said conductive elements.

8. A clip according to claim 7 wherein each conductive element is provided with a cross-sectional disconformity and each channel is correspondingly formed to cooperate with said disconformities to prevent longitudinal displacement of the conductive elements.

9. A clip according to claim 7 wherein the cover member is provided with forwardly extending parallel recesses, each constituting a continuation of a respective groove, said recesses being partially enclosed by a forwardly extending edge portion of the adjacent plate.

* * * * *